United States Patent Office 3,813,372
Patented May 28, 1974

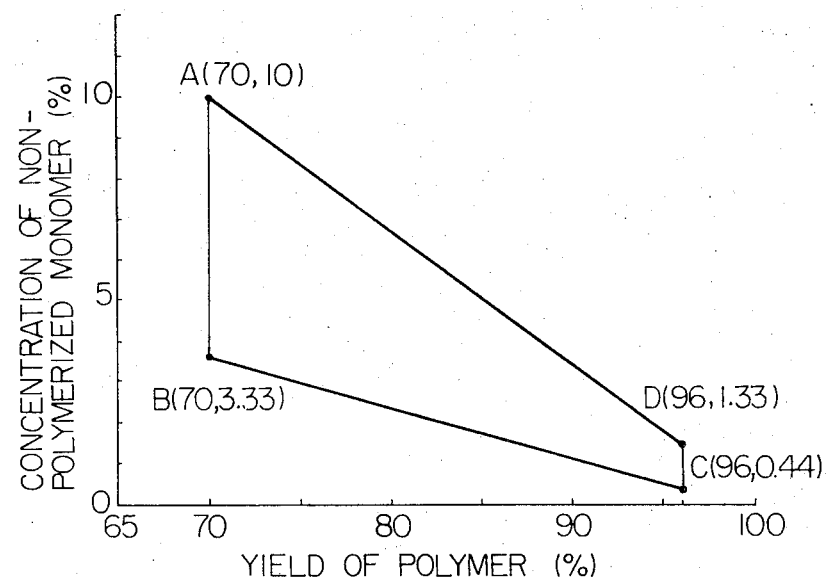

3,813,372
METHOD OF MANUFACTURING ACRYLONITRILE POLYMERS HAVING AN EXCELLENT WHITENESS
Yasushi Joh and Teruhiko Sugimori, Otake, Japan, assignors to Mitsubishi Rayon Company Limited, Tokyo, Japan
Continuation of abandoned application Ser. No. 162,921, July 15, 1971. This application Feb. 23, 1973, Ser. No. 335,121
Claims priority, application Japan, July 27, 1970, 45/64,979
Int. Cl. C08f 3/76, 15/02, 15/22
U.S. Cl. 260—88.7 R                       1 Claim

ABSTRACT OF THE DISCLOSURE

An acrylonitrile polymer useful for producing acrylonitrile synthetic fiber having an excellent whiteness and a superior heat stability is prepared by the polymerization method wherein the acrylonitrile is polymerized or copolymerized in the presence of a redox catalyst at a concentration of monomer to be polymerized in water which concentration is so adjusted that the concentration of non-polymerized monomer remaining in water which relates to the yield of the resultant polymer is on or within the quadrilateral ABCD defined in the accompanying drawing.

CROSS REFERENCE TO RELATED APPLICATIONS

This application is a continuation of our co-pending application, Ser. No. 162,921, filed July 15, 1971 and now abandoned.

The present invention relates to a method of manufacturing acrylonitrile synthetic polymers having an excellent whiteness, more particularly, relates to a method of manufacturing acrylonitrile synthetic polymers usable for forming acrylonitrile synthetic fibers having an excellent whiteness by polymerizing acrylonitrile alone or copolymerizing at least 50% by weight of acrylonitrile and the balance of a monomer capable of copolymerizing with the acrylonitrile in the presence of a redox catalyst containing nitrous acid or its salt and a reducing sulfoxyl compound.

It is well-known that there are various catalysts for manufacturing the acrylonitrile synthetic polymers. The catalysts include substances which themselves have the ability of initiating the polymerization and compositions consisting of two or more substances having catalytic property for the polymerization. Particularly, it is known that the so-called redox catalysts are effective for the production of the acrylonitrile synthetic polymers. The redox catalyst consists of a mixture of an oxidizing agent and a reducing agent each itself having no catalytic property for the polymerization. Generally, the utility of the polymerization catalyst must be estimated not only on the basis of its initiating and accelerating properties for the polymerization but on the basis of properties of the product obtained by utilizing the catalyst. In view of the above estimation, it is relatively difficult to find a catalyst which is effective for producing the polymer having superior properties at a high efficiency.

As is widely known, the fiber-forming acrylonitrile polymers are required to have various properties necessary for manufacturing the synthetic fiber, and the qualities of the acrylonitrile synthetic fiber depend on the qualities of the acrylonitrile polymer to be converted into the fiber. This dependance is similar to that of the other synthetic fibers, for example, polyamide, such as nylon 66, and polyester fibers.

The fiber-forming acrylonitrile polymers are required to have various excellent properties such as processabilities in the fibers manufacturing process.

The required processabilities include (1) a superior transportation property of the polymer which relates to formal properties of the polymer, (2) a high stability in a process for feeding the polymer into a polymer solution-preparing system which stability depends on bulkiness of the polymer powder and size and shape of the polymer particle and means a property such that the polymer can be fed into the polymer solution-preparing system at a uniform feeding rate with no formation of the so-called bridge with the polymer powder, (3) a high stability in spinning process and (4) a high processability in drawing process or draft-cutting process, for example, tarbo stapler. The fiber-forming acrylonitrile polymers have a further requirement that the acrylonitrile synthetic fibers produced from the polymer can be spun into a yarn having excellent quality in a favorable spinning condition, and have a high whiteness, a superior heat stability, a good dyeing property and non-variation in dyeing exhaustion level, and the article prepared from the acrylonitrile synthetic fibers has a good hand feeling.

In order to prepare the desirable polymer sufficiently satisfying the above-mentioned various requirements, it is important that the catalyst is carefully selected, the polymerization is carried out under pertinent conditions, and the quality of the product is suitably controlled.

In the case where the above-mentioned requirements are not satisfied, it is impossible to obtain the high quality acrylonitrile polymer however the conditions for processing the spinning and other steps thereafter are varied.

From the above-viewpoint, the inventors have carefully studied the production process of the fiber-forming acrylonitrile polymer, particularly, the polymerization catalyst and the polymerization condition, more particularly, the redox polymerization catalyst containing nitrous acid or its salt and a reducing sulfoxyl compound. From the study, the inventors have found a polymerization condition effective for obtaining an acrylonitrile polymer or copolymer having excellent properties such as an excellent whiteness and a superior heat-stability and hence the present invention.

An object of the present invention is to provide a method of manufacturing an acrylonitrile polymer which has an excellent whiteness and is useful for producing an acrylonitrile synthetic fiber having an excellent whiteness and a good heat stability.

Such object can be accomplished by the method of the present invention wherein acrylonitrile monomer alone or a mixture of the acrylonitrile monomer and another monomer capable of copolymerizing with the acrylonitrile is polymerized in water in the presence of a redox catalyst containing nitrous acid or its salt and a reducing sulfoxyl compound at a concentration of the monomer or monomers in water so adjusted that when the polymerization is completed at an expected yield of the resultant polymer, a concentration of non-polymerized monomer remaining in water is in a range specified hereinafter.

The concentration (C) of the non-polymerized monomer in water is calculated according to the equation:

$C$ (percent)
$$= \frac{\text{Quantity of non-polymerized monomer (g.)}}{\text{Quantity of water (g.)}} \times 100$$

wherein the quantity of non-polymerized monomer is the difference between the initial total quantity of the monomer employed for the polymerization and the quantity of the resultant polymer.

The feature of the present invention will be made more apparent by the description set forth in detail hereinafter and by the accompanying drawing.

The drawing is a graph for defining the range of concentration in percent of non-polymerized monomer remaining in water corresponding to an expected yield in percent of the resultant polymer, in which range the polymerization according to the method of the present invention is carried out effectively.

From a systematic study by the inventors, it was found that when the concentration of monomer to be polymerized in water is adjusted so that the concentration of non-polymerized monomer remaining in water which is calculated on the basis of the expected yield of the polymer to be produced is on or within the quadrilateral ABCD defined in the accompanying drawing, the resultant polymer has an excellent whiteness and a superior heat stability and is very useful for producing the acrylonitrile synthetic fiber.

In the accompanying drawing, the ordinate represents the concentration of non-polymerized monomer in water in percentage by weight and the abscissa represents the yield of the polymer in percentage by weight and the quadrilateral ABCD is defined by co-ordinates A (70, 10), B (70, 3.33), C (96, 0.44) and D (96, 1.33).

Therefore, it is obvious that the method of the present invention can be applied only to the polymerization which is carried out under an expected yield of the polymer of from 70 to 96% by weight.

The catalyst usable for the polymerization according to the method of the present invention consists of a mixture of nitrous acid or its salt, for example, sodium nitrite, potassium nitrite, ammonium nitrite, calcium nitrite and magnesium nitrite, and a reducing sulfoxyl compound for example, sulfurous acid, sulfites such as sodium, potassium and ammonium sulfites, bisulfites such as sodium, potassium and ammonium bisulfites, and metabisulfites such as sodium and potassium metabisulfites. Catalysts other than the above-mentioned redox catalyst can not be applied to the polymerization according to the method of the present invention. Accordingly, it should be noted that the method of the present invention is effective only for polymerization utilizing the above-specified redox catalyst and resulting in the yield of polymer as limited above.

The reason why the method of the present invention is effective only for the above restricted polymerization is not clear as yet. However, it is supposed that the redox catalyst is closely related with the radical-forming behavior of the monomer and the features of the resultant polymer slurry.

In the performance of the method of the present invention, each of the catalyst components may be added separately to the polymerization system or may be added into the system after the components have been previously mixed and reacted with each other.

The method of the present invention can be applied to the polymerization of acrylonitrile alone or to the copolymerization of at least 50% by weight of acrylonitrile with the balance of monomer capable of copolymerizing with the acrylonitrile.

The monomer capable of polymerizing with the acrylonitrile may be selected from ethylenically unsaturated monomer such as vinyl acetate, ethyl acrylate, methyl acrylate, methyl methacrylate, methacrylonitrile, methylene glutaronitrile, vinyl bromide, vinyl chloride, vinylidene chloride, acrylamide, N,N'-substituted acrylamides, methacrylamide, acrylic acid and methacrylic acid. The group of monomer includes, of as a matter of course, basic or strongly acid monomers useful for modifying the dyeing property of acrylonitrile polymer, for example, vinyl pyridines, dimethyl amino ethyl acrylate and methacrylic sulfonic acid.

It is preferable that the polymerization according to the method of the present invention is carried out at a tempearture of 40 to 60° C. Further, it is preferable that the polymerization according to the method of the present invention is performed at a pH of 2.0 to 3.0.

The feature of the method of the present invention is explained in more detail by the following examples which include comparison examples for clearly illustrating the effect of the method of the present invention.

In the examples, the whiteness of the fibers is indicated by a ratio of reflectivity of the fiber with respect to that of a magnesium oxide plate which reflectivity is determined by means of an automatic recording spectrophotometer (type EPU–2) made by Hitachi Seisakusho, Japan.

EXAMPLE 1

In order to prepare acrylonitrile polymer from acrylonitrile in a polymerization yield of 72% based on the initial weight of the acrylonitrile, 100 parts by weight of acrylonitrile were mixed with 600 parts by weight of water, 7.2 parts by weight of sodium hydrogensulfite and 0.8 parts of sodium nitrite. In this case, it was expected that, after completing the polymerization, the concentration of the non-polymerized acrylonitrile which remained in water would be 4.67% by weight. A point having the co-ordinate (72, 4.67) is contained within the quadrilateral ABCD defined in the accompanying drawing.

The mixture was adjusted to a pH of 2.6 by using sulfuric acid and subjected to polymerization at a temperature of 45° C. for 5 hours. The resultant polymer was filtered, washed with water and dried. The yield of the resultant polyacrylonitrile was 72% by weight which was the same as that expected previously. Therefore, the non-polymerized acrylonitrile remained in the mixture in a concentration of 4.67% which was equal to that expected previously.

The polyacrylonitrile was dissolved in dimethyl formamide in a concentration of 28% by weight in order to prepare a spinning solution. The spinning solution was subjected to the conventional dry-spinning process to prepare acrylonitrile synthetic filaments. The resultant filaments were drawn, washed with water, treated with an oil agent and then dried under conventional conditions. The dried filaments were further heat-treated at a temperature of 135° C. in order to redox them. The acrylonitrile synthetic fiber thus heat-treated had a whiteness of 98.6. This result shows the fact that the polyacrylonitrile which was prepared by the process according to the present invention, is highly useful for producing the acrylonitrile synthetic fiber having an excellent whiteness and a superior heat stability.

For comparison, 80 parts by weight of acrylonitrile were mixed with 1200 parts by weight of water, 4.5 parts by weight of sodium hydrogensulfite and 0.26 parts by weight of sodium nitrite. The mixture was subjected to polymerization at a temperature of 52° C. for 10 hours. 67 parts by weight of polymer was obtained. This corresponds to a yield of about 84% based on the initial weight of the acrylonitrile.

The concentration of the non-polymerized acrylonitrile which remained in the water was 1.07% by weight. It is clear that the point having the co-ordinates (84, 1.07) lies outside the quadrilateral ABCD of the accompanying drawing.

A spinning solution containing 29% by weight of the resultant polymer in dimethyl formamide was dry-spun, and the resultant filaments were drawn, washed with water, dried and then heated-relaxed at a temperature of 135° C. The resultant filaments thus heat-relaxed had a whiteness of 92.0 which is lower than that of the example.

For further comparison, 100 parts by weight of acrylonitrile were mixed with 250 parts by weight of water, 4.0 parts by weight of sodium hydrogensulfite and 0.20 parts by weight of sodium nitrite. The mixture was adjusted to a pH of 2.7 by using sulfuric acid and subjected to polymerization at a temperature of 45° C. for 6 hours. The resultant polymer was filtered, washed with water and then dried. 75 parts by weight of the polymer was obtained in a yield of 75% based on the initial weight of acrylonitrile. The concentration of non-polymerized acrylonitrile in water was 10%. The point having co-ordinate (75, 10) lies outside the quadrilateral ABCD. The resultant copolymer contained some solid masses of the polymer. The polymer was dissolved in dimethyl formamide in a concentration of 29% by weight. The resultant acrylonitrile polymer was converted into filaments by conventional dry spinning and drawn in hot water at a draw ratio of 3.5 and then heat-relaxed at a temperature of 145° C.

The resultant acrylonitrile synthetic filament had a low whiteness of 92.0.

EXAMPLE 2

In order to prepare an acrylonitrile copolymer in a yield of 73% based on the initial weight of the comonomers, 94 parts by weight of acrylonitrile and 6 parts by weight of methyl acrylate were mixed with 410 parts by weight of water of an aqueous catalyst solution which was prepared by dissolving 6.5 parts by weight of sodium metabisulfite and 0.8 parts by weight of sodium nitrite into 20 parts by weight of water and reacting them at a pH of 5.0 at a temperature of 55° C. for 10 minutes. In this case, it was expected that the polymerization would be completed in a concentration of noncopolymerized monomers in water of 6.0% by weight.

The point having the co-ordinates (73, 6.0) is contained within the quadrilateral ABCD defined in the accompanying drawing. The polymerization mixture was adjusted to a pH of 2.5 by using sulfuric acid, and then polymerized at a temperature of 48° C. for 5 hours in a polymerization reactor. A copolymer consisting of 94.1% by weight of acrylonitrile and 5.9% by weight of methyl acrylate was isolated in a yield of 73% by weight.

The concentration of the non-copolymerized monomer in water was 6.0% by weight.

The resultant copolymer was subjected to the same filament manufacturing process as that of Example 1. The acrylonitrile copolymer filament obtained had a superior whiteness of 98.8.

For comparison, an acrylonitrile-methyl acrylate copolymer filament was prepared by the following process different from that of the present invention.

A mixture of 93 parts by weight of acrylonitrile and 7 parts by weight of methyl acrylate was dissolved in 1,400 parts by weight of water.

A polymerization reactor filled by nitrogen gas was charged with the mixture and then charged with an aqueous solution containing 7.5 parts by weight of sodium metabisulfite in 50 parts by weight of water The reaction mixture in the reactor was adjusted to a pH of 2.2 using 1 N-sulfuric acid and mixed with an aqueous solution of 0.75 parts by weight of sodium nitrite in 50 parts by weight of water.

The polymerization system thus prepared was polymerized at a temperature of 58° C. for 5 hours. The resultant copolymer was filtered, washed with water and dried. 70 parts by weight of copolymer consisting of 92% by weight of acrylonitrile and 8% by weight of methyl acrylate was obtained. This showed that the yield of the copolymer was 70% based on the initial total weight of the monomers, and the concentration of non-copolymerized monomers in water was 2.0% by weight.

In the accompanying drawing, it is clear that the point having co-ordinates (70, 2.0) lies outside the quadrilateral ABCD.

The copolymer was dissolved in dimethyl acetamide in a concentration of 23% by weight in order to prepare a spinning solution. The spinning solution was subjected to conventional wet-spinning and then heat relaxed at a temperature of 135° C.

The resultant filament had a low whiteness of 93.4.

In consideration of the whitenesses of the filaments of the present example and the comparison example, it was concluded that the acrylonitrile copolymer prepared by the process according to the present invention is capable of the forming acrylonitrile copolymer filaments having an excellent whiteness and heat-stability.

EXAMPLE 3

In order to prepare an acrylonitrile copolymer in a yield of 81% based on the initial total weight of co-monomers, 91 parts by weight of acrylonitrile and 9 parts by weight of vinyl acetate were mixed with 260 parts by weight of water and an aqueous catalyst solution. In this case, it was expected that the polymerization would be completed in a concentration of non-copolymerized comonomers which remained in water of 5.94% by weight. The point having the co-ordinates (81, 5.94) is within the quadrilateral ABCD defined in the accompanying drawing. The catalyst solution was prepared by the procedure wherein an aqueous solution of 7.5 parts by weight of sodium sulfite in 20 parts by weight of water is mixed with an aqueous solution of 0.6 part by weight of sodium nitrite in 20 parts by weight of water the mixture solution adjusted to a pH of 5.5 by using an aqueous solution of sodium bicarbonate in 20 parts by weight of water, and reacted at a temperature of 30° C. for 30 minutes while stirring.

The polymerization mixture was heated at a temperature of 42° C. for 4 hours in order to copolymerize the comonomers. The resultant copolymer was filtered and dried. The yield of the copolymer was 81% by weight and therefore, the concentration of the non-copolymerized comonomers in water was 5.94% by weight. The copolymer consisted of 93% by weight of acrylonitrile and 7% by weight of vinyl acetate.

The copolymer was dissolved into dimethyl acetamide in a concentration of 25% by weight, and from the resultant solution, an acrylonitrile copolymer filament was prepared by the conventional wet-spinning method.

The resultant acrylonitrile copolymer filament had a superior whiteness of 99.2.

For comparison, an aqueous solution of 91 parts by weight of acrylonitrile and 9 parts by weight of vinyl acetate in 250 parts by weight of water was charged into a polymerization reactor being filled with nitrogen gas, an aqueous solution of 5 parts by weight of sodium sulfite in 10 parts by weight of water was added to the comonomer solution, and then an aqueous solution of 0.8 part by weight of sodium nitrite in 10 parts by weight of water was added to the mixture.

The reaction mixture was adjusted to a pH of 2.4 by adding 10 parts by weight of water containing sodium bicarbonate and then maintained at a temperature of 60° C. for 10 hours in order to copolymerize the comonomers. The resultant copolymer was filtered and dried. The copolymer consisted of 93% by weight of acrylonitrile and 7% by weight of vinyl acetate. The yield was 90% based on the initial total weight of the comonomers, and therefore, the concentration of the non-polymerized comonomers in water was 3.6% by weight. It was observed that the point having coordinate (90, 3.6) lies outside the quadrilateral ABCD defined in the accompanying drawing.

The copolymer filament which was prepared by the same procedure as that of the present example, had a low whiteness of 93.1.

EXAMPLE 4

In order to prepare an acrylonitrile copolymer in a yield of 85% based on the initial total weight of comonomers, 93% by weight of acrylonitrile and 7% by weight of methyl methacrylate were mixed in 700 parts by weight of water in the presence of 7.5 parts by weight of sodium hydrogensulfite and 0.75 part by weight of sodium nitrite. In this case it was expected that when the polymerization of the comonomers was finished, the concentration of non-copolymerized comonomers in water would be 2.14% by weight. The point having co-ordinates (85, 2.14) is within the quadrilateral ABCD defined in the accompanying drawing. The reaction mixture was adjusted to a pH of 2.5 by adding sulfuric acid, and then heated at a temperature of 50° C. for 7 hours.

A copolymer was obtained in a yield of 85% by weight. The concentration of non-polymerized comonomers in water was 2.14%.

The resultant copolymer was dissolved in dimethyl acetamide in a concentration of 22% by weight and then the solution was wet-spun, drawn and heat-relaxed in the same procedure as that of Example 1. The resultant filament had a high whiteness of 99.0.

EXAMPLE 5

In order to prepare an acrylonitrile copolymer in a yield of 92.5% based on the initial total weight of comonomers, 92 parts by weight of acrylonitrile 7 parts by weight of vinyl acetate and 1 part by weight of dimethyl acrylamide were mixed with 750 parts by weight of water, and then 0.8 part by weight of sodium nitrite and 5.0 parts by weight of sodium metabisulfite were added to the mixture.

In this case, it was expected that when the polymerization of the comonomers was finished, the concentration of non-polymerized comonomers in water would be 1.0% by weight. The point having co-ordinates (92.5, 1.0) is within the quadrilateral ABCD in the accompanying drawing.

The reaction mixture was polymerized at a temperature of 58° C. for 10 hours. The yield of the copolymer was 92.5%, and the concentration of the non-polymerized comonomers in water was 1.0% by weight.

The resultant copolymer was dissolved in dimethyl acetamide in a concentration of 24% by weight, and then the solution was wet-spun, drawn and heat-relaxed using the same procedure as that of Example 1.

The resultant filament had a superior whiteness of 96.7.

EXAMPLE 6

In order to prepare an acrylonitrile copolymer in a yield of 96%, 94 parts by weight of acrylonitrile and 6 parts by weight of methyl acrylate were mixed with 450 parts by weight of water.

An aqueous catalyst solution was prepared by dissolving 5 parts by weight of sodium hydrogensulfite and 0.8 parts by weight of sodium nitrite in 50 parts by weight of water, reacting them at a pH of 5.0 which was adjusted by sulfuric acid, for 10 minutes, adjusting it to a pH of 2.5 by adding sulfuric acid and then further reacting them at a temperature of 55° C. for 10 minutes. The catalyst solution thus prepared was mixed with the comonomer mixture.

It was expected that when the polymerization of the comonomers was finished, the concentration of non-polymerized comonomer in water would be 0.82% by weight. The point having co-ordinate (96, 0.82) lies within the quadrilateral ABCD of the accompanying drawing.

The reaction mixture was polymerized at a temperature of 52° C. for 11 hours at a pH of 2.5 which was adjusted by sulfuric acid.

A copolymer having an excellent whiteness was obtained at a yield of 96% by weight. The concentration of the non-polymerized comonomers in water was 0.82%.

The resultant copolymer was dissolved in dimethyl formamide in a concentration of 28.6% by weight, and the solution was wet-spun drawn and heat-relaxed using the same procedure as that of Example 1.

The resultant filament had an excellent whiteness of 98.6.

What we claim is:

1. In the method for the manufacture of a homopolymer or copolymer of acrylonitrile having an excellent whiteness by polymerizing at a temperature of 40–60° C. in an acidic aqueous medium having a pH of 2.0 to 3.0, a monomeric material containing at least 50% by weight of acrylonitrile in the presence of a redox catalyst containing nitrous acid or its salt and a reducing sulfoxyl compound yielding a polymer of 70 to 96% by weight based on the initial weight of monomer, the improvement which comprises, adjusting the concentration of said monomeric material to a value which satisfies the condition that when the polymerization is completed in said yield of the resultant polymer, the concentration of non-polymerized monomeric material in water is on or within a quadrilateral defined by the drawing, in a rectangular co-ordinate system having the ordinate representing the concentration in percentage of said non-polymerized monomeric material in water and the abscissa representing the yield in percentage of said resultant polymer, by co-ordinates A (70, 10), B (70, 3.33), C (96, 0.44) and D (96, 1.33).

References Cited

UNITED STATES PATENTS 3,213,069  10/1965  Rausch _____ 260—85.5 N

OTHER REFERENCES

Schnecko, Chem. ABS., 59, p. 10241f (1963).
Chem. ABS., 62, p. 5411c (1965).

HARRY WONG, Jr., Primary Examiner

U.S. Cl. X.R.

260—32.6 N, 79.3 M, 85.5 D, 85.5 P, 88.7 G